US006672924B2

(12) United States Patent
Compen

(10) Patent No.: US 6,672,924 B2
(45) Date of Patent: Jan. 6, 2004

(54) METHOD OF MANUFACTURING A CATHODE RAY TUBE

(75) Inventor: Johannes Maria Azalina Antonius Compen, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 94 days.

(21) Appl. No.: 10/011,906

(22) Filed: Dec. 3, 2001

(65) Prior Publication Data

US 2002/0068497 A1 Jun. 6, 2002

(30) Foreign Application Priority Data

Dec. 4, 2000 (EP) .......................................... 00204302

(51) Int. Cl.[7] .................................................. H01S 9/26
(52) U.S. Cl. ........................................... 445/45; 446/58
(58) Field of Search ............................... 445/9, 14, 45, 445/58

(56) References Cited

U.S. PATENT DOCUMENTS

| | | | | | |
|---|---|---|---|---|---|
| 2,639,555 | A | * | 5/1953 | Buttino et al. | 65/42 |
| 3,589,791 | A | * | 6/1971 | Kanellopoulos | 445/45 |
| 3,802,757 | A | * | 4/1974 | Benda et al. | 445/19 |
| 4,080,695 | A | * | 3/1978 | Gallaro et al. | 427/58 |
| 4,154,494 | A | * | 5/1979 | Skinner et al. | 445/45 |
| 4,217,521 | A | | 8/1980 | Dietch et al. | 313/479 |
| 4,515,569 | A | * | 5/1985 | Hernqvist | 445/5 |
| 4,602,187 | A | * | 7/1986 | Fischman et al. | 445/45 |
| 4,826,463 | A | * | 5/1989 | Strauss | 445/45 |
| 4,988,915 | A | * | 1/1991 | Zegers | 313/479 |
| 5,145,437 | A | * | 9/1992 | Ondra et al. | 445/45 |
| 5,300,856 | A | * | 4/1994 | Bartch et al. | 313/479 |
| 5,304,891 | A | * | 4/1994 | Otsuka | 313/479 |
| 5,357,166 | A | * | 10/1994 | Sugahara et al. | 313/479 |
| 5,572,086 | A | * | 11/1996 | Tong et al. | 445/58 |
| 5,572,087 | A | * | 11/1996 | Vrijssen | 313/479 |
| 5,698,258 | A | | 12/1997 | Takizawa et al. | 427/64 |
| 6,033,279 | A | * | 3/2000 | Van der Tempel et al. | 445/45 |

FOREIGN PATENT DOCUMENTS

| | | | |
|---|---|---|---|
| EP | 0366090 A2 | 5/1990 | H01J/29/88 |
| GB | 2224596 A | 5/1990 | H01J/29/88 |
| WO | 9849112 | 11/1998 | C03C/17/23 |

OTHER PUBLICATIONS

Patent Abstracts of Japan, Nakamura Koji, "Manufacture Of Cathode–Ray Tube," Publication No. 03263741, Nov. 25, 1991, Application No. 02063074, Mar. 13, 1990.

* cited by examiner

*Primary Examiner*—Anthony Dinkins
*Assistant Examiner*—Angel R. Estrada

(57) ABSTRACT

The invention relates to a method of manufacturing a cathode ray tube (1). In the method, a cone part (4) of the tube is first provided with a first coating (13) so as to reduce an annoying crackling sound, whereafter a neck part (5) is connected to the cone part (4). Due to the presence of a closing element (20) on the cone part (4), said first coating is prevented from covering an inner surface of the cone part (4). As a consequence, the performance of the tube is not affected. A good quality of the connection is obtained if the layer thickness of the first coating (13) is equal to or less than 1 μm. A suitable material for the first coating is Antimony Tin Oxide combined with TEOS.

8 Claims, 1 Drawing Sheet

METHOD OF MANUFACTURING A CATHODE RAY TUBE

TECHNICAL FIELD

Figure 1:
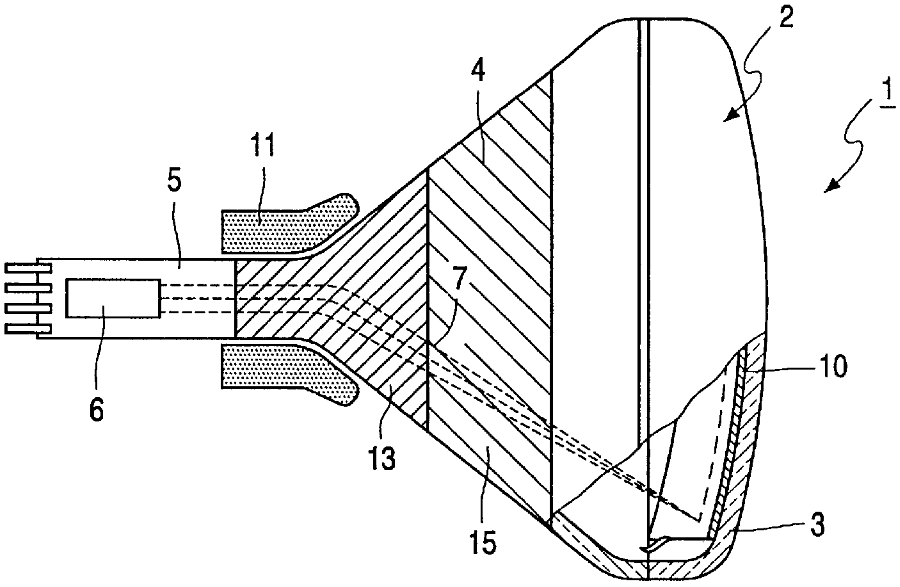

The invention relates to a method of manufacturing a cathode ray tube from a neck part and a cone part.

BACKGROUND AND SUMMARY

U.S. Pat. No. 4,217,521 discloses a television picture tube having a resistive coating which is deposited on an outer area of the tube and is in contact with a conductive coating to disperse any static charges by means of a flow of electrons through the resistive coating. The "rush" of electrons is attenuated thereby and thus suppresses an annoying crackling sound taking place upon tube turn-on and turn-off. Furthermore, any residual high-potential charges remaining after turn-off are discharged to ground.

Conventionally, the neck part and the cone part are first connected to each other during manufacture of such a television picture tube, while the resistive coating is applied in a later phase of the manufacturing process. Initially, i.e. before the connection step has taken place, the cone part is closed at a side that is to be connected to the neck part: the so-called "stub". During the connection step, this stub is removed, whereafter the cone part and the neck part are connected to form a tube assembly. In a later phase of the tube manufacturing process, the coating is applied e.g. by brushing or spraying the tube assembly with a suspension of the coating and subsequent drying of the coating.

The conventional way of manufacturing such a television picture tube has the drawback of being a complex process in view of the required steps of controlling the electrical and mechanical coating properties. Furthermore, these measures are not always fully effective and increase the cost price of the tube.

It is an object of the invention to provide a method of manufacturing a display device that does not have the above-mentioned drawback. To this end, the invention is characterized in that the method comprises the steps of: coating an external surface of the cone part with a coating, and subsequently connecting the cone part to the neck part.

The inventors have realized that, if the order of processing is reversed, i.e. first applying the coating to the cone part and then connecting the neck part and the cone part, the required measures for controlling the coating properties may be substantially reduced. In the method according to the invention, the cone part is first provided with the coating by immersing it into a bath containing the suspension of the coating. Due to the presence of the stub, the inner part of the cone part remains free from the coating. The cone part and the neck part are connected by first removing the stub and then connecting the cone part and the neck part together in the conventional way.

Advantageous embodiments of the invention are defined in the dependent claims.

These and other aspects of the invention will be elucidated with reference to the embodiments described hereinafter.

BRIEF DESCRIPTION OF THE DRAWING FIGURES

Figure 2:
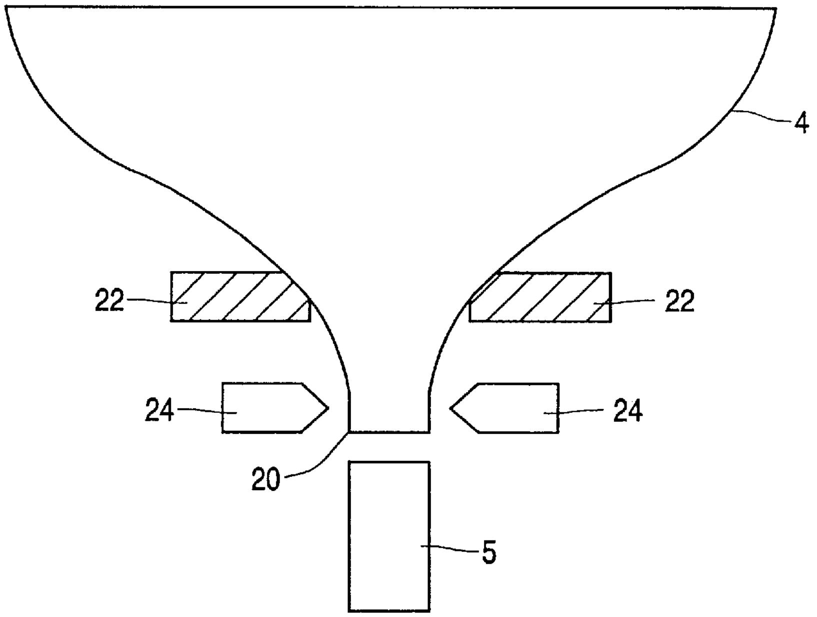

In the drawings,

FIG. 1 is a sectional view of a cathode ray tube according to the invention, and FIG. 2 shows a phase of the manufacturing process according to the prior art.

In general, like reference numerals identify like elements.

DETAILED DESCRIPTION

A cathode ray tube 1 as shown in FIG. 1 has an evacuated envelope 2 comprising a display window 3, a cone part 4 and a neck part 5. The neck part 5 accomodates an electron gun 6 for generating at least one electron beam 7. A display screen 10 is situated on the inner side of the display window. The display screen comprises a large number of phosphor elements that emit light after being hit by the at least one electron beam 7. On their way to the display screen 10, the at least one electron beam 7 is deflected in two mutually perpendicular directions across the display screen by means of a deflection unit 11, which is positioned around the cone part 4. During operation of the cathode ray tube, a charging of the glass of the tube particularly in the vicinity of the deflection unit 11 often takes place. As a consequence of this charging phenomenon an annoying crackling sound occurs, particularly when the cathode ray tube is turned on and off. To reduce this crackling sound, a first coating 13 is applied on the cone part in the vicinity of the deflection unit. This first coating is in contact with a conductive second coating 15 to disperse any static charges by means of a flow of electrons through the first coating. The "rush" of electrons is attenuated thereby and thus suppresses the annoying crackling sound taking place upon tube turn-on and turn-off. Furthermore, any residual high-potential charges remaining after turn-off are discharged to ground.

Conventionally, the first coating is applied after the joining process of the cone part 4 and the neck part 5 has been finished. This has the drawback of being a complex process in view of the required steps of controlling the electrical and mechanical coating properties. Furthermore, these measures are not always fully effective and increase the cost price of the tube.

In the conventional manufacturing process, the cone part 4 is initially closed at a side that is to be connected to the neck part; this element 20 is called the "stub". Before the connection step takes place, the stub 20 is removed. This phase of the conventional manufacturing process is shown in FIG. 2. The cone part 4 is positioned in supporting elements 22. Then an area in the vicinity of the stub 20 is softened by the heat provided by burners 24 whereafter the stub 20 is removed. Next, the cone part 4 and the neck part 5 are connected to form a tube assembly. In a later phase of the tube manufacturing process, the first coating is applied e.g. by brushing or spraying the tube assembly with a suspension of the coating and subsequent drying of the coating. The conventional way of manufacturing such a cathode ray tube has the drawback that measures need to be taken during the application of the coating to prevent an inner surface of the cone and/or neck parts from becoming covered with the resistive coating. The presence of the coating on the inner surface may affect the performance of the picture tube. However, these measures are not always fully effective and increase the cost price of the tube.

The inventors have realized that the coating process is substantially simplified if the order of processing is reversed, i.e. first applying the first coating to the cone part 4 and then connecting the neck part 5 and the cone part 4. In the method according to the invention, the cone part 4 is first provided with the coating by immersing it into a bath containing the suspension of the first coating. Due to the presence of the stub 20, the inner part of cone part 4 remains free from the first coating. The cone part and the neck part are connected by first removing the stub and then connecting the cone part and the neck part together in the conventional way. By suitable choice of the material of the first coating, it is prevented in a preferred embodiment, that the presence of the first coating affects the quality of the connection of the cone part and the neck part. This is particularly the case when the layer thickness of the first coating is much smaller than the layer thickness of the conventional first coating, which is about 10 $\mu$m. Good results were obtained with layer thicknesses equal to or less than 1 $\mu$m. The first coating has good functional properties with respect to the reduction of the crackling sound if an electrical resistivity of the applied coating is in the range of $10^6$ and $10^{10}$ ohm/square. Thin layers of the first coating in combination with the indicated resistance value can be obtained if the first coating comprises compounds of Sn, In or Ru or a mixture of these compounds. Antimony Tin Oxide (ATO) has proved to be a very suitable material for this application, particularly when ATO is applied in combination with TEOS (Tetra Ethoxy Ortho Silicate). Such layers are easily available in view of their applicability as anti-static coating materials on display screens, they adhere very well to the surface and dry within a short time. Furthermore, the material has the advantages of being inexpensive, not visible and a stable and satisfactorily adjustable electrical resistance, both under (even extreme) humid and dry conditions. To withstand the high temperatures of the subsequent annealing step that follows the coating step, organic materials are excluded as adhesive and binder materials, and inorganic materials are preferred. Good results were obtained by using inorganic silicates or phosphates as binder materials.

As a consequence of the good environmental stability of the coating layer, no additional hygroscopie organic materials such as stabilizers and dispensers are required and the coating process requires fewer control steps and is therefore simplified.

In summary, the invention relates to a method of manufacturing a cathode ray tube 1. In the method, a cone part 4 of the tube is first provided with a first coating 13 so as to reduce an annoying crackling sound, whereafter a neck part 5 is connected to the cone part 4. Due to the presence of a closing element 20 on the cone part 4, said first coating is prevented from covering an inner surface of the cone part 4. Therefore, the performance of the tube is not affected. A good quality of the connection is obtained if the layer thickness of the first coating 13 is equal to or less than 1 $\mu$m. A suitable material for the first coating is Antimony Tin Oxide combined with TEOS.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The mere fact that certain measures are recited in mutually different dependent claims does not indicate that a combination of these measures cannot be used to advantage.

What is claimed is:

1. A method of manufacturing a cathode ray tube from a neck part and a cone part, the method comprising:

coating an external surface of the cone part with a coating, and subsequently connecting the cone part to the neck part.

2. A method as claimed in claim 1, wherein a layer thickness of the coating is equal to or less than 1 $\mu$m.

3. A method as claimed in claim 1, wherein the coating comprises a material having an electrical resistivity in the range of $10^6$ and $10^{10}$ ohm/square.

4. A method as claimed in claim 3, wherein the material comprises compounds of Sn, In or Ru or a mixture of these compounds.

5. A method as claimed in claim 4, wherein the material comprises Antimony Tin Oxide (ATO).

6. A method as claimed in claim 5, wherein the material comprises an inorganic binder material.

7. A method as claimed in claim 1, wherein the cone part comprises an element which closes an opening of the cone part on a side which is to be connected to the neck part, which element is present while coating the external surface of the cone part and is removed prior to connecting the cone part to the neck part.

8. The method as claimed in claim 1, wherein coating the external surface of the cone part includes immersing the external surface into a bath that includes a suspension of material comprising the coating.

* * * * *